(No Model.)

J. H. KOLB.
APPARATUS FOR THE SEPARATION OF TIN FROM TIN SCRAP.

No. 308,902. Patented Dec. 9, 1884.

WITNESSES:

INVENTOR
John H. Kolb
BY
ATTORNEYS

UNITED STATES PATENT OFFICE.

JOHN H. KOLB, OF BROOKLYN, NEW YORK, ASSIGNOR OF ONE-THIRD TO WILLIAM J. MATHESON, OF SAME PLACE.

APPARATUS FOR THE SEPARATION OF TIN FROM TIN-SCRAP.

SPECIFICATION forming part of Letters Patent No. 308,902, dated December 9, 1884.

Application filed April 3, 1884. (No model.)

*To all whom it may concern:*

Be it known that I, JOHN H. KOLB, a citizen of the United States, residing in the city of Brooklyn, county of Kings, and State of New York, have invented certain new and useful improvements in apparatus for the separation of tin from tin-scrap or for boiling and concentrating chemical salts, of which the following, taken in connection with the accompanying drawings, is a full, clear, and accurate description.

The object of my invention is to boil and concentrate chemical salts in such a manner that their chemical structure or composition shall not be injured, as it is when the usual method of boiling and concentrating by boiling the salts in an open vessel is followed. By this usual method the salts are liable to be destroyed and their chemical composition altered by the corrosive local heat, and while the upper portion of the solution may not be heated to the required temperature, the lower portion is liable to be hardened into a solid mass and rendered insoluble. These objections are entirely removed by my apparatus, the essential principle of which is exposing all parts of the solution as the salts are being boiled and concentrated to an equal heat.

Figure 1:
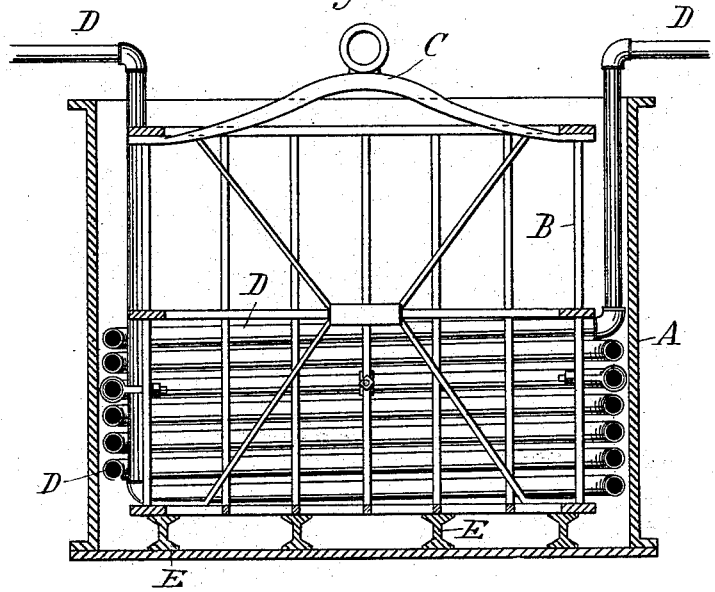
Figure 2:
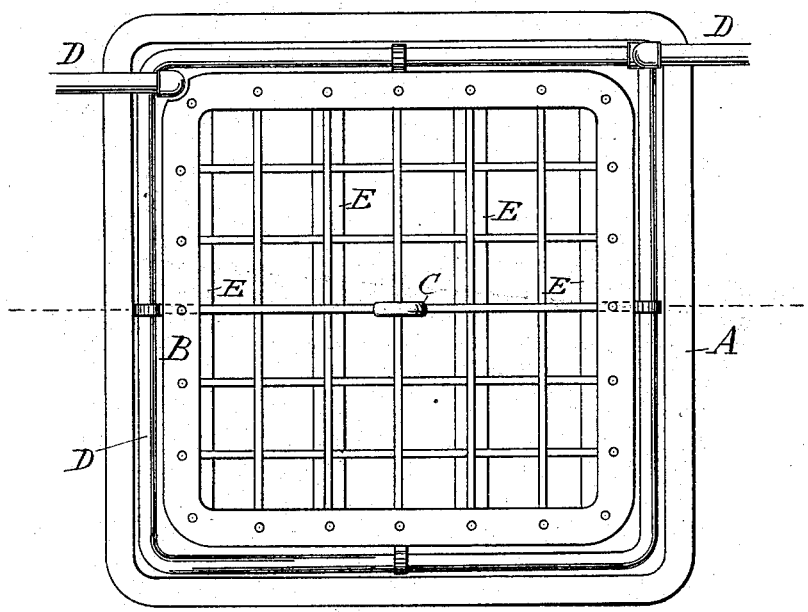

In the drawings, Figure 1 is a plan view of the same. Fig. 2 is a sectional view.

My apparatus, though not confined to that purpose, is especially designed and adapted to stripping or reducing the tin from the iron of tin-scrap or tin-clippings or other iron coated with tin.

In the drawings, A represents a tank, of iron or other suitable material, of proper capacity to contain the dissolving-solution, which, in case of tin-scrap, is the well-known mixture of nitrate of soda and caustic soda, or any of the other well-known chemical agents.

B is a crate or basket of open-work material, in which is placed the tin-scrap to be operated on, and is provided with a handle, C, by means of attaching which handle the crate can be lowered or raised from the tank surrounding the crate or basket B, and secured thereto is a coil of steam-pipe, D, the ends of of which extend upward above the level of the top of the tank and are connected by a joint or connection (not shown in the drawings) with the source of steam-supply. The other end of the coil is connected with a suitable exhaust-pipe.

E E are standards or rests in the tank A, to support the crate above the floor of said tank and to permit the solution to constantly reach the tin-scrap.

The mode of operation is as follows: Into the tank A is put a suitable quantity of the dissolving-solution, and the crate or basket B is filled with the tin-scrap to be stripped. It is then lowered with its attached coil of pipe D into the tank A and rested upon the supports E. The temporary connections with source of steam supply and exhaust being made and the steam turned on, the heat of the steam as it circulates through the coil of the pipe D causes the dissolving-solution to boil equally and uniformly in all its parts and to act equally and uniformly on the tin-scrap and the tin thereon, which enters into chemical composition with the solution, forming stannate of soda. After the tin is thoroughly dissolved from the tin-scrap in the crate, the steam is turned off, the temporary connections are removed from the coil of pipe D, the crate B lifted out by a crane or other suitable means from the tank A, emptied of contents, and a fresh supply of tin-scrap placed therein, and the same operation is then repeated until the dissolving-solution in the tank becomes thoroughly saturated with the tin removed from the tin-scrap. When removed, the crate and coil of pipe are thoroughly rinsed or washed in a proper rinsing or washing tank in such manner as to remove any salts or solution adhering to them. The solution is then removed from the tank and evaporated in any proper manner to recover or concentrate the stannate of soda contained therein.

In recovering tin from tin-scrap I use a tank of such containing-capacity that I can easily use one thousand to three thousand gallons of the dissolving-solution, which is the quantity I prefer. The crate I prefer has a containing capacity of about from two thousand to three thousand pounds of tin-scrap. With these quantities I prefer to leave the tin-scrap to be stripped in the solution for from two to eight hours, and I preferably use a pressure of steam of about sixty pounds to the square inch.

I do not intend to confine myself to the quantities above given. The quantities may be varied in amount; but I prefer that about the same relative proportions should be preserved between them.

I do not confine the use of my apparatus to the purpose of stripping tin-scrap of tin; but the same apparatus can be used generally for boiling and concentrating chemical salts.

I am aware that it is not new to employ a removable crate for containing the material to be operated upon, and also that it is not new to employ a stationary steam-coil for heating the salts in the art to which the invention appertains, and do not claim such as my invention.

Having thus described my invention what I claim, and desire to secure by Letters Patent, is—

1. An apparatus for removing or stripping the tin from tin-scrap and for other purposes, consisting of the combination, with a tank or proper vessel for holding the dissolving solution or liquid, of a crate or other proper receptacle provided with a coil of pipe or proper apparatus, which coil or apparatus is connected or disconnected at will with a source of steam-supply or other proper supply of heat.

2. An apparatus for removing or stripping the tin from tin-scrap or other purposes, consisting of the combination, with a tank or other proper vessel for holding the dissolving solution or liquid, of a crate or other proper receptacle to which is secured a coil of pipe or other proper attachment, the crate and its attachment being removable at will from the tank, and such coil of pipe being connected and disconnected at will with steam or other heat supply.

In testimony whereof I have hereunto set my hand this 21st day of March, 1884.

JOHN H. KOLB.

In presence of—
    LOUIS W. FROST,
    R. T. VAN BOSKERCK.